United States Patent
Makino

(10) Patent No.: US 7,262,959 B2
(45) Date of Patent: Aug. 28, 2007

(54) DRAWER-TYPE STORAGE-UNIT HOUSING APPARATUS

(75) Inventor: Tomoya Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 11/208,774

(22) Filed: Aug. 22, 2005

(65) Prior Publication Data

US 2006/0259685 A1  Nov. 16, 2006

(30) Foreign Application Priority Data

May 10, 2005  (JP) ............................. 2005-137461

(51) Int. Cl.
*G06F 1/16* (2006.01)
(52) U.S. Cl. .................... 361/685; 700/299; 62/93; 318/601
(58) Field of Classification Search ............. 700/299; 123/41.31; 236/13; 62/93; 318/601; 361/679–687, 361/724–727
See application file for complete search history.

(56) References Cited

U.S. PATENT DOCUMENTS 5,732,215 A   3/1998  Boutaghou et al.
5,875,965 A   3/1999  Lee
2005/0273208 A1* 12/2005  Yazawa et al. ............. 700/299

FOREIGN PATENT DOCUMENTS

| CN | 1566713 A | * | 1/2005 |
| JP | 8-335143  |   | 12/1996 |
| JP | 11-022698 |   | 1/1999 |
| JP | 3531662   |   | 3/2004 |
| JP | 2004-139724 |   | 5/2004 |

* cited by examiner

*Primary Examiner*—Hung Van Duong
(74) *Attorney, Agent, or Firm*—Greer, Burns & Crain, Ltd.

(57) ABSTRACT

An apparatus for housing a drawer-type storage unit including a storage unit that stores data and a case in which the storage unit is contained in a drawable manner includes a drawing-status determining unit that determines whether the case is drawn from the apparatus; and a fan controlling unit that controls a revolutions-per-minute of a fan provided in the apparatus based on a result of determination by the determining unit.

10 Claims, 4 Drawing Sheets

DRAWER-TYPE STORAGE-UNIT HOUSING APPARATUS

BACKGROUND OF THE INVENTION

1. Field of the Invention

The present invention relates to a technology for preventing an abrupt increase of a temperature in a case of a drawer-type storage-unit housing apparatus.

2. Description of the Related Art

In a redundant-arrays-of-independent-disks (RAID) system, a plurality of hard disks is stored in a case, so that the hard disks can be managed efficiently, and space required for installing the RAID system is saved. The RAID system typically employs a drawer-type case that can be drawn open, so that the hard disks can be inspected or exchanged without difficulty.

However, the temperature within the case is increased by the hard disks. The hard disks can be harmed by excessively high temperature. One approach is to provide a cooling fan in the case to prevent the temperature from rising, as disclosed in Japanese Patent No. 3531662.

However, when the case is drawn open, the temperature within the case rises sharply due to the external temperature.

The case is left open for a considerable length of time because an administrator of the RAID system needs to inspect/exchange the hard disks with care, in consideration of safety and reliability. As a result, the temperature within the case rises excessively, which leads to an adverse impact on components inside the case.

SUMMARY OF THE INVENTION

It is an object of the present invention to at least solve the problems in the conventional technology.

An apparatus according to one aspect of the present invention, which is for housing a drawer-type storage unit including a storage unit that stores data and a case in which the storage unit is contained in a drawable manner, includes a drawing-status determining unit that determines whether the case is drawn from the apparatus; and a fan controlling unit that controls a revolutions-per-minute of a fan provided in the apparatus based on a result of determination by the determining unit.

A method according to another aspect of the present invention, which is for controlling an apparatus for housing a drawer-type storage unit including a storage unit that stores data and a case in which the storage unit is contained in a drawable manner, includes determining whether the case is drawn from the apparatus; and controlling a revolutions-per-minute of a fan provided in the apparatus based on a result of determination at the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

A concept of a drawer-type storage-unit housing apparatus (hereinafter, "drawer-type hard-disk housing apparatus") according to an embodiment of the present invention is described below. When a user draws open a case storing hard disks from the drawer-type hard-disk housing apparatus, a fan provided inside the case is rotated at high-speed, so as to prevent a temperature increase within the case.

When the temperature inside the case is decreased by the fan, the rotational speed of the fan is reduced. Thus, power consumption is saved, and noise emitted from an accelerated fan is suppressed.

Figure 1:
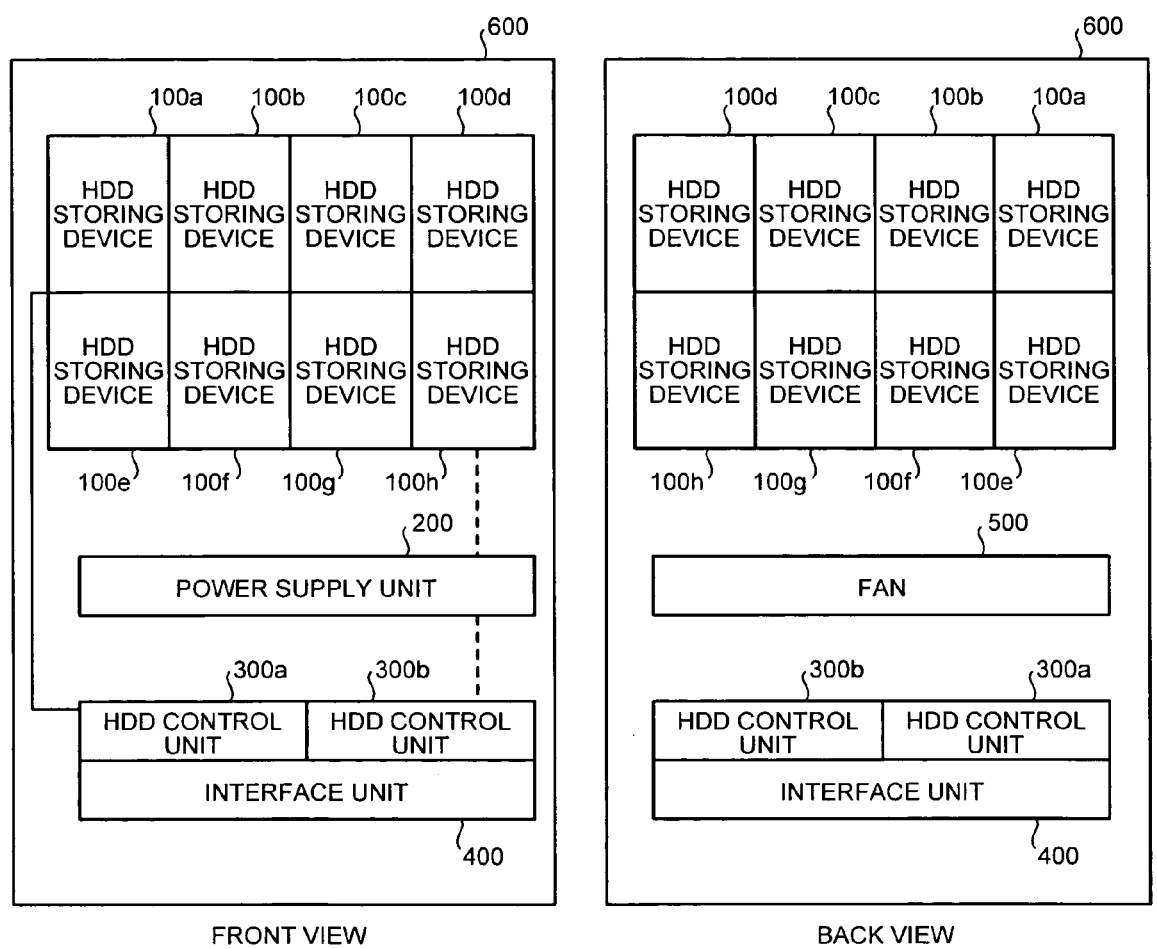
FIG. 1 is a functional block diagram of a drawer-type hard-disk housing apparatus according to an embodiment of the present invention.

FIG. 1 is a functional block diagram of a drawer-type hard-disk housing apparatus 600 according to the present embodiment. The drawer-type hard-disk housing apparatus 600 includes hard disk drive (HDD) storing devices 100a to 100h, a power supply unit 200, HDD control units 300a, 300b, an interface unit 400, and a fan 500. The left diagram is a front view, and the right diagram is a back view of the drawer-type hard-disk housing apparatus 600.

Each of the HDD storing devices 100a to 100h stores a plurality of hard disks, and includes a cooling fan. When a user draws open any of the HDD storing devices 100a to 100h, the fan is rotated to prevent a temperature increase.

Furthermore, when any of the HDD storing devices 100a to 100h is drawn open, the surrounding HDD storing devices are prevented from being drawn open. For example, when the HDD storing device 100b is drawn open, the HDD storing devices 100a, 100f, and 100c are locked. Thus, a temperature increase in a surrounding HDD storing device is efficiently prevented.

The power supply unit 200 supplies power to the HDD storing devices 100a to 100h, the HDD control units 300a, 300b, the interface unit 400, and the fan 500.

The HDD control unit 300a manages the HDD storing devices 100a to 100h, and requests the HDD storing devices 100a to 100h to write/read data. Furthermore, when any of the HDD storing devices 100a to 100h is drawn open, the HDD control unit 300a restricts the amount of data being transferred to the HDD storing device drawn open. This prevents a temperature increase of the hard disks stored inside the HDD storing device drawn open.

The HDD control unit 300b manages the HDD storing devices 100a to 100h when the HDD control unit 300a fails.

The interface unit 400 uses a specific communication protocol to communicate with other server devices, and the fan 500 cools the power supply unit 200.

Figure 2:
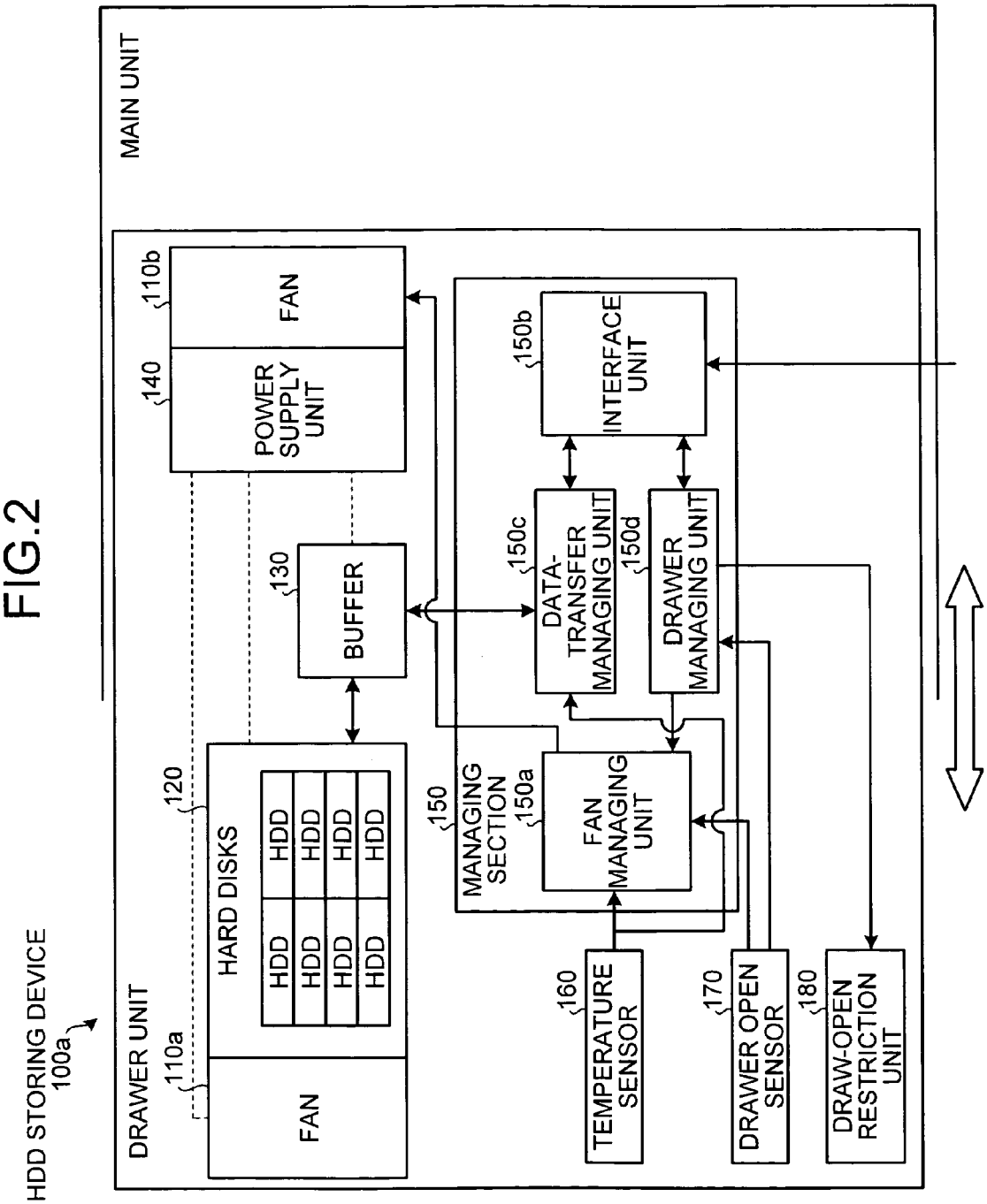
FIG. 2 is a functional block diagram of a HDD storing device shown in FIG. 1.

FIG. 2 is a functional block diagram of the HDD storing device 100a. Descriptions of the HDD storing devices 100b to 100e are omitted because they have the same configuration as the HDD storing device 100a. The HDD storing device 100a includes fans 110a, 110b, hard disks 120, a buffer 130, a power supply unit 140, a managing section 150, a temperature sensor 160, a drawer open sensor 170, and a draw-open restriction unit 180.

The fans 110a, 110b are used to cool the inside of the HDD storing device 100a. The rotational speed of the fans 110*a*, 110*b* is changed according to an instruction from the managing section 150. The hard disks 120 include a plurality of hard disks storing data acquired from the buffer 130.

The buffer 130 temporarily stores data acquired from the managing section 150, and passes the data to the hard disks 120. Furthermore, the buffer 130 temporarily stores data acquired from the hard disks 120, and passes the data to the managing section 150.

The power supply unit 140 supplies power to the fans 110*a*, 110*b*, the hard disks 120, the buffer 130, and the managing section 150.

The managing section 150 manages the fans 110*a*, 110*b*, and the hard disks 120. The managing section 150 includes a fan managing unit 150*a*, an interface unit 150*b*, a data-transfer managing unit 150*c*, and a drawer managing unit 150*d*.

The fan managing unit 150*a* manages the rotational speed and rotational directions of the fans 110*a*, 110*b*, based on information acquired by the temperature sensor 160 and the drawer open sensor 170. The temperature sensor 160 detects the temperature within the HDD storing device 100*a*, and passes the data of the detected temperature (hereinafter, "temperature data") to the fan managing unit 150*a* and the data-transfer managing unit 150*c*. The HDD storing device 100*a* consists of a main unit and a drawer unit that is drawn open from the main unit. The drawer unit stores the fans 110*a*, 110*b*, the hard disks 120, the buffer 130, the power supply unit 140, the managing section 150, the temperature sensor 160, the drawer open sensor 170, and the draw-open restriction unit 180. When the drawer unit is drawn open from the main unit, the drawer open sensor 170 notifies this to the fan managing unit 150*a*.

When a notification that the drawer unit is drawn open is received, the fan managing unit 150*a* increases the rotational speed of the fans 110*a*, 110*b*. Furthermore, the fan managing unit 150*a* controls the rotational directions of the fans 110*a*, 110*b* so as to make air flow into the drawer unit from outside.

When the drawer unit is drawn open, the top part of the drawer unit is uncovered. Accordingly, air from the fan 110*a* and air from the fan 110*b* clash into each other. As a result, heat of the hard disks 120 is efficiently discharged outside the HDD storing device 100*a*, enhancing a cooling effect.

Furthermore, when temperature data acquired from the temperature sensor 160 is below a predetermined level, the fan managing unit 150*a* reduces the rotational speed of the fans 110*a*, 110*b* to a regular speed.

When the drawer unit of the HDD storing device 100*a* is drawn open, the fan managing unit 150*a* increases the rotational speed of the fans 110*a*, 110*b*. When the temperature within the HDD storing device 100*a* is sufficiently decreased by the cooling effect of the accelerated fans 110*a*, 110*b*, the fan managing unit 150*a* reduces the rotational speed of the fans 110*a*, 110*b* to a regular speed. Thus, power consumption can be saved, and noise emitted from the fans 110*a*, 110*b* can be suppressed. When the temperature within the HDD storing device 100*a* exceeds a predetermined level, the fan managing unit 150*a* accelerates the fans 110*a*, 110*b* again.

When the fan managing unit 150*a* receives a notification that a drawer unit of any of the surrounding HDD storing devices is drawn open, the fan managing unit 150*a* accelerates the fans 110*a*, 110*b*. This minimizes a temperature increase within the HDD storing device 100*a* caused by the external temperature.

The interface unit 150*b* uses a specific communication protocol to communicate with the HDD control units 300*a*, 300*b*, and the HDD storing devices 100*b* to 100*h*.

The data-transfer managing unit 150*c* acquires data from the interface unit 150*b*, and transfers the data to the hard disks 120 though the buffer 130. The data-transfer managing unit 150*c* transfers data temporarily stored in the buffer 130 to the interface unit 150*b*.

When the data-transfer managing unit 150*c* receives from the drawer managing unit 150*d* a notification that the drawer unit of the HDD storing device 100*a* is drawn open, the data-transfer managing unit 150*c* restricts the amount of data being transferred from the buffer 130 to the hard disks 120. This prevents the temperature of the hard disks 120 from increasing.

The data-transfer managing unit 150*c* acquires temperature data from the temperature sensor 160, and determines whether the temperature within the HDD storing device 100*a* exceeds a predetermined level. When the temperature exceeds the predetermined level, the data-transfer managing unit 150*c* restricts the amount of data being transferred from the buffer 130 to the hard disks 120.

When the temperature falls below the predetermined level, the data-transfer managing unit 150*c* releases the restriction on the amount data being transferred from the buffer 130 to the hard disks 120.

When the drawer managing unit 150*d* receives from the drawer open sensor 170 a notification that the drawer unit of the HDD storing device 100*a* is drawn open, the drawer managing unit 150*d* transfers the notification to the fan managing unit 150*a*, the data-transfer managing unit 150*c*, the HDD storing devices 100*b* to 100*h*, and the HDD control units 300*a*, 300*b*.

When the HDD control units 300*a*, 300*b* receives from the drawer managing unit 150*d* the notification that the drawer unit is drawn open, the amount of data transferred from the HDD control units 300*a*, 300*b* to the HDD storing device 100*a* is restricted. Thus, a temperature increase within the HDD storing device 100*a* is prevented.

When the drawer managing unit 150*d* receives a notification that any of the HDD storing devices 100*b* to 100*h* is drawn open, the drawer managing unit 150*d* instructs the draw-open restriction unit 180 to lock the drawer unit of the HDD storing device 100*a* so that is not drawn open from the main unit. Thus, the temperature within the HDD storing device 100*a* is unaffected.

Figure 3:
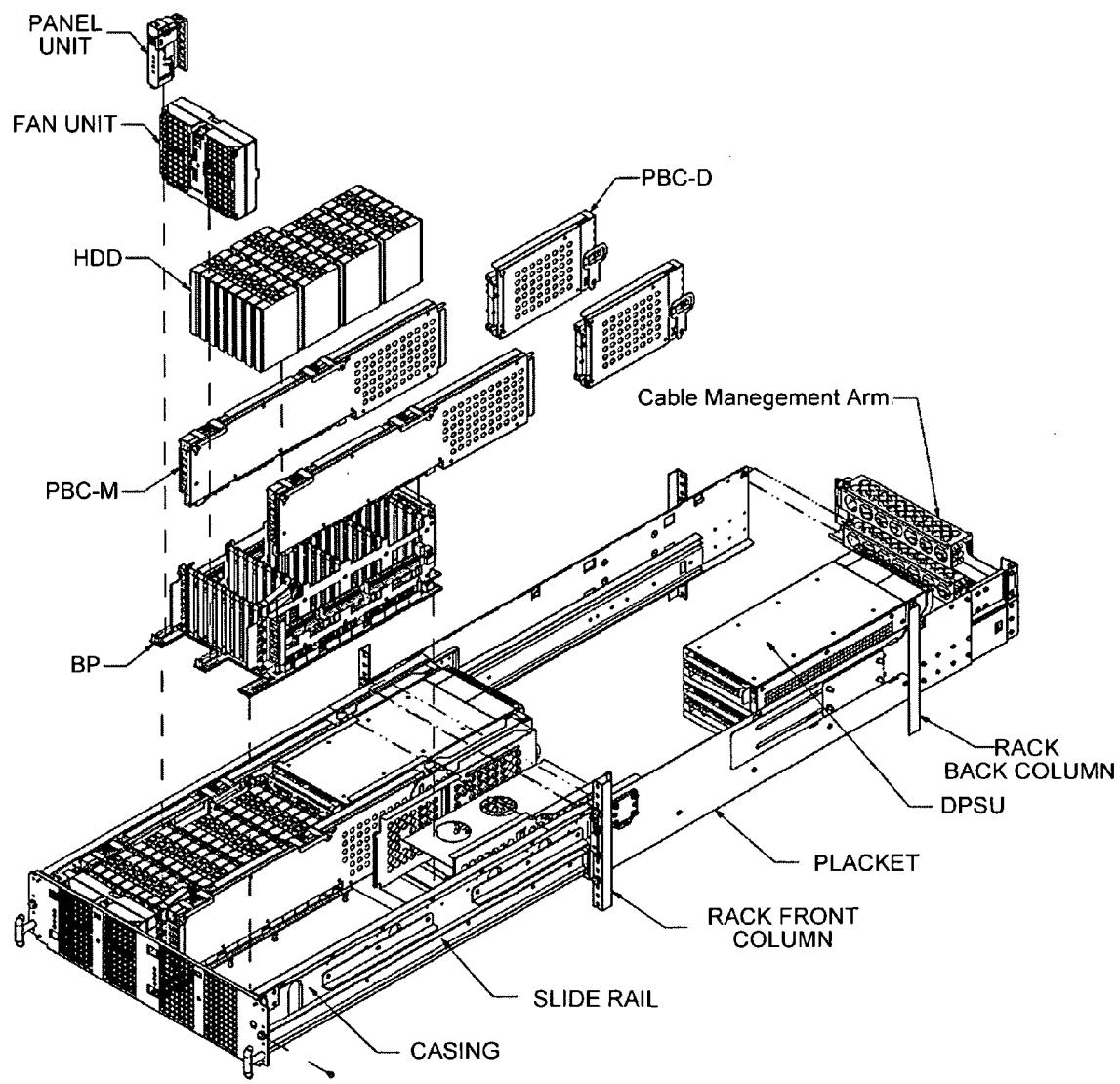
FIG. 3 is a perspective view of a frame format of the HDD storing device.

FIG. 3 is a perspective view of a frame format of the HDD storing device 100*a*. The HDD storing device 100*a* includes a fan unit (corresponding to the fan 110*a* shown in FIG. 2), an HDD (corresponding to the hard disks 120 shown in FIG. 2), a port bypass controller (PBC) (corresponding to the managing section 150 shown in FIG. 2), a buffer pool (BP) (corresponding to the buffer 130 shown in FIG. 2), and so forth.

Figure 4:
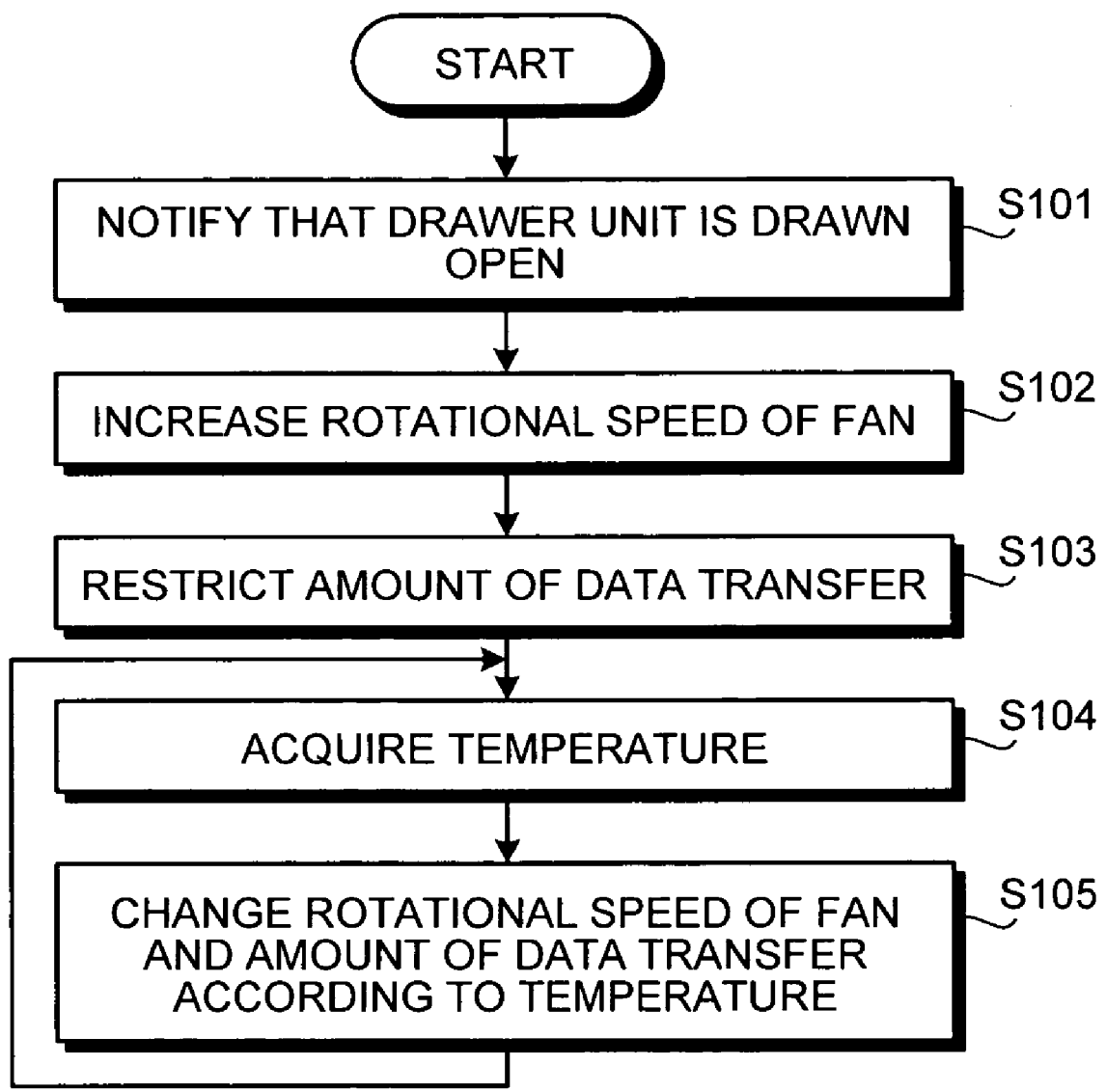
FIG. 4 is a flowchart of a processing performed by the HDD storing device.

FIG. 4 is a flowchart of a processing performed by the HDD storing device 100*a*. When the drawer unit of the HDD storing device 100*a* is drawn open, the drawer open sensor 170 sends a notification to the fan managing unit 150*a* and the drawer managing unit 150*d* that the drawer unit of the HDD storing device 100*a* is drawn open (step S101), and the fan managing unit 150*a* increases the rotational speed of the fans 110*a*, 110*b* (step S102).

The drawer managing unit 150*d* sends a notification to the data-transfer managing unit 150*c* that the drawer unit is drawn open, and the data-transfer managing unit 150*c* restricts the amount of data being transferred from the buffer 130 to the hard disks 120 (step S103).

The fan managing unit 150a and the data-transfer managing unit 150c acquires temperature data from the temperature sensor 160 (step S104). Based on the temperature acquired, the fan managing unit 150a changes (or maintains) the rotational speed of the fans 110a, 110b, and the data-transfer managing unit 150c changes (or maintains) the amount of data being transferred from the buffer 130 to the hard disks 120 (step S105), and the system control returns to step S104.

In the drawer-type hard-disk housing apparatus 600 according to the present embodiment, when the drawer open sensor 170 detects that the drawer unit of the HDD storing device 100a is drawn open, the drawer open sensor 170 notifies this to the fan managing unit 150a, and the fan managing unit 150a increases the rotational speed of the fans 110a, 110b. Moreover, when the drawer unit is drawn open, the data-transfer managing unit 150c restricts the amount of data being transferred from the buffer 130 to the hard disks 120, so that the temperature within the HDD storing device 100a is efficiently prevented from increasing. The same applies to any of the HDD storing devices 100b to 100h.

According to the present invention, the temperature within a case is prevented from increasing.

Furthermore, according to the present invention, the temperature of hard disks is prevented from rising.

Moreover, according to the present invention, power consumption is saved, and noise emitted from a fan is suppressed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for housing a drawer-type storage unit including a storage unit that stores data and a case in which the storage unit is contained in a drawable manner, the apparatus comprising:
   a drawing-status determining unit that determines whether the case is drawn from the apparatus; and
   a fan controlling unit that controls a revolutions-per-minute of a fan provided in the apparatus based on a result of determination by the determining unit.

2. The apparatus according to claim 1, further comprising a data-amount control unit that controls an amount of data transferred to the storage device, wherein
   the data-amount control unit controls the amount of data to be transferred to the storage unit based on the result of determination by the determining unit.

3. The apparatus according to claim 2, further comprising a temperature detecting unit that detects a temperature of the apparatus, wherein
   the fan controlling unit decreases the revolutions-per-minute of the fan when the temperature detected is below a predetermined temperature.

4. The apparatus according to claim 3, wherein the data-amount control unit controls the amount of data based on the temperature detected.

5. The apparatus according to claim 1, wherein
   a plurality of drawer-type storage units and a plurality of fans are provided,
   when any one of the cases is drawn from the apparatus, the fan controlling unit increases a revolutions-per-minute of a fan that is installed near the case that is drawn from the apparatus.

6. The apparatus according to claim 5, further comprising a restricting unit that restricts, when any one of the cases is drawn from the apparatus, a drawing of other case from the apparatus.

7. The apparatus according to claim 1, further comprising a notifying unit that notifies, when the drawing-status determining unit determines that the case is drawn from the apparatus, a data managing apparatus that makes a request for writing data to the apparatus that the case is drawn from the apparatus, to decrease an amount of data transfer from the data managing apparatus.

8. The apparatus according to claim 1, wherein
   the fan includes a suction fan and an exhaust fan, and
   the fan controlling unit controls the suction fan and the exhaust fan so that air is convected within the case, based on the result of determination by the determining unit.

9. A method of controlling an apparatus for housing a drawer-type storage unit including a storage unit that stores data and a case in which the storage unit is contained in a drawable manner, the method comprising:
   determining whether the case is drawn from the apparatus; and
   controlling a revolutions-per-minute of a fan provided in the apparatus based on a result of determination at the determining.

10. The method according to claim 9, further comprising controlling an amount of data transferred to the storage device, wherein
    the controlling an amount of data includes controlling the amount of data to be transferred to the storage unit based on the result of determination at the determining.

* * * * *